United States Patent
Wu

(10) Patent No.: US 7,064,994 B1
(45) Date of Patent: Jun. 20, 2006

(54) DYNAMIC MEMORY THROTTLING FOR POWER AND THERMAL LIMITATIONS

(75) Inventor: Chung-Hsiao R. Wu, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 104 days.

(21) Appl. No.: 10/768,782

(22) Filed: Jan. 30, 2004

(51) Int. Cl.
*G11C 7/04* (2006.01)

(52) U.S. Cl. .................. 365/211; 365/212; 713/332; 713/323; 713/401; 700/299; 702/132

(58) Field of Classification Search ............... 365/211, 365/212; 713/322, 323, 401; 702/132; 700/299
See application file for complete search history.

(56) References Cited

U.S. PATENT DOCUMENTS

| | | | |
|---|---|---|---|
| 4,913,038 A * | 4/1990 | Burkett et al. ................. 99/331 |
| 4,989,256 A * | 1/1991 | Buckley ....................... 706/41 |
| 5,490,059 A | 2/1996 | Mahalingaiah et al. |
| 5,623,902 A * | 4/1997 | Nusser et al. .......... 123/339.16 |
| 5,639,163 A * | 6/1997 | Davidson et al. ........... 374/178 |
| 5,710,911 A * | 1/1998 | Walsh et al. ................ 713/500 |
| 5,778,425 A * | 7/1998 | Shigeeda ..................... 711/122 |
| 5,870,621 A * | 2/1999 | Walsh et al. ................. 712/32 |
| 5,881,271 A * | 3/1999 | Williams .................... 713/401 |
| 5,987,244 A * | 11/1999 | Kau et al. ................... 713/500 |
| 6,002,627 A * | 12/1999 | Chevallier .................. 365/212 |
| 6,058,012 A | 5/2000 | Cooper et al. |
| 6,172,611 B1 * | 1/2001 | Hussain et al. ............. 340/584 |
| 6,349,385 B1 | 2/2002 | Kaminski et al. |
| 6,453,218 B1 * | 9/2002 | Vergis ........................ 700/299 |
| 6,470,289 B1 | 10/2002 | Peters et al. |
| 6,778,453 B1 * | 8/2004 | Cooper et al. .............. 365/212 |
| 6,789,037 B1 | 9/2004 | Gunther et al. |
| 2001/0021217 A1 | 9/2001 | Gunther et al. |
| 2002/0173858 A1 | 11/2002 | Sherlock |
| 2003/0115013 A1 | 6/2003 | Dendinger |
| 2003/0131160 A1 * | 7/2003 | Hampel et al. ................ 710/22 |
| 2003/0135767 A1 | 7/2003 | Chu et al. |
| 2003/0158697 A1 * | 8/2003 | Gold et al. .................. 702/132 |
| 2004/0117678 A1 * | 6/2004 | Soltis et al. ................. 713/320 |
| 2004/0159776 A1 * | 8/2004 | Richard et al. .......... 250/214 R |
| 2004/0162697 A1 * | 8/2004 | Smith et al. ................ 702/132 |

* cited by examiner

*Primary Examiner*—Viet Q. Nguyen
(74) *Attorney, Agent, or Firm*—Meyertons Hood Kivlin Kowert & Goetzel, P.C.; B. Noël Kivlin; Mario J. Lewin

(57) ABSTRACT

In one embodiment, a memory controller is coupled to a memory subsystem and controls accesses to the memory subsystem. In addition, a temperature sensor is positioned to detect a temperature associated with the memory subsystem. In this embodiment, the memory controller is configured to selectively insert one or more idle clock cycles between a first memory access and a second memory access depending upon the sensed temperature. In a further embodiment, a sensor is positioned to detect a power condition associated with the memory subsystem. In this embodiment, the memory controller is configured to selectively insert one or more idle clock cycles between a first memory access and a second memory access depending upon the detected power condition.

14 Claims, 6 Drawing Sheets

DYNAMIC MEMORY THROTTLING FOR POWER AND THERMAL LIMITATIONS

BACKGROUND OF THE INVENTION

1. Field of the Invention

This invention relates to computer systems and, more particularly, to monitoring and controlling the temperature and power consumption of a memory subsystem.

2. Description of the Related Art

As the memory density and speed of memory devices continue to increase, the power consumption and the heat dissipation associated with these devices also increase. The performance of memory devices and of the corresponding computer system may be degraded if the power consumption and/or the temperature of the memory devices are too high. Therefore, temperature and power management techniques may be implemented in computer systems to reduce performance degradation due to temperature and power consumption issues.

One method that may reduce the temperature and power consumption of a memory device is to control the clock rate associated with the memory device. A temperature sensor may be positioned to sense the temperature of the memory device. The clock rate may be maintained or changed depending upon whether the sensed temperature is above or below a temperature threshold. For example, the clock rate may be maintained or increased if the sensed temperature is below the temperature threshold. If the sensed temperature rises above the temperature threshold, the clock rate may be decreased. By decreasing the clock rate, the temperature and power consumption of the memory device may also decrease.

Another method that may reduce the temperature of a memory device is to change the speed of a system fan depending upon a measured temperature associated with the memory device. More particularly, the speed of a system fan that cools the memory device may be increased if the sensed temperature is above a threshold. The speed of the fan may be maintained or lowered if the sensed temperature is below the threshold.

SUMMARY OF THE INVENTION

Various embodiments of dynamic memory throttling for power and thermal limitations are disclosed. In one embodiment, a memory controller is coupled to a memory subsystem for controlling accesses to the memory subsystem. In addition, a temperature sensor is positioned to detect a temperature associated with the memory subsystem. In this embodiment, the memory controller is configured to selectively insert one or more idle clock cycles between a first memory access and a second memory access depending upon the sensed temperature.

In a further embodiment, a sensor is coupled to detect a power condition associated with the memory subsystem, such as the amount of current being drawn. In this embodiment, the memory controller is configured to selectively insert one or more idle clock cycles between a first memory access and a second memory access depending upon the detected power condition.

Figure 1:
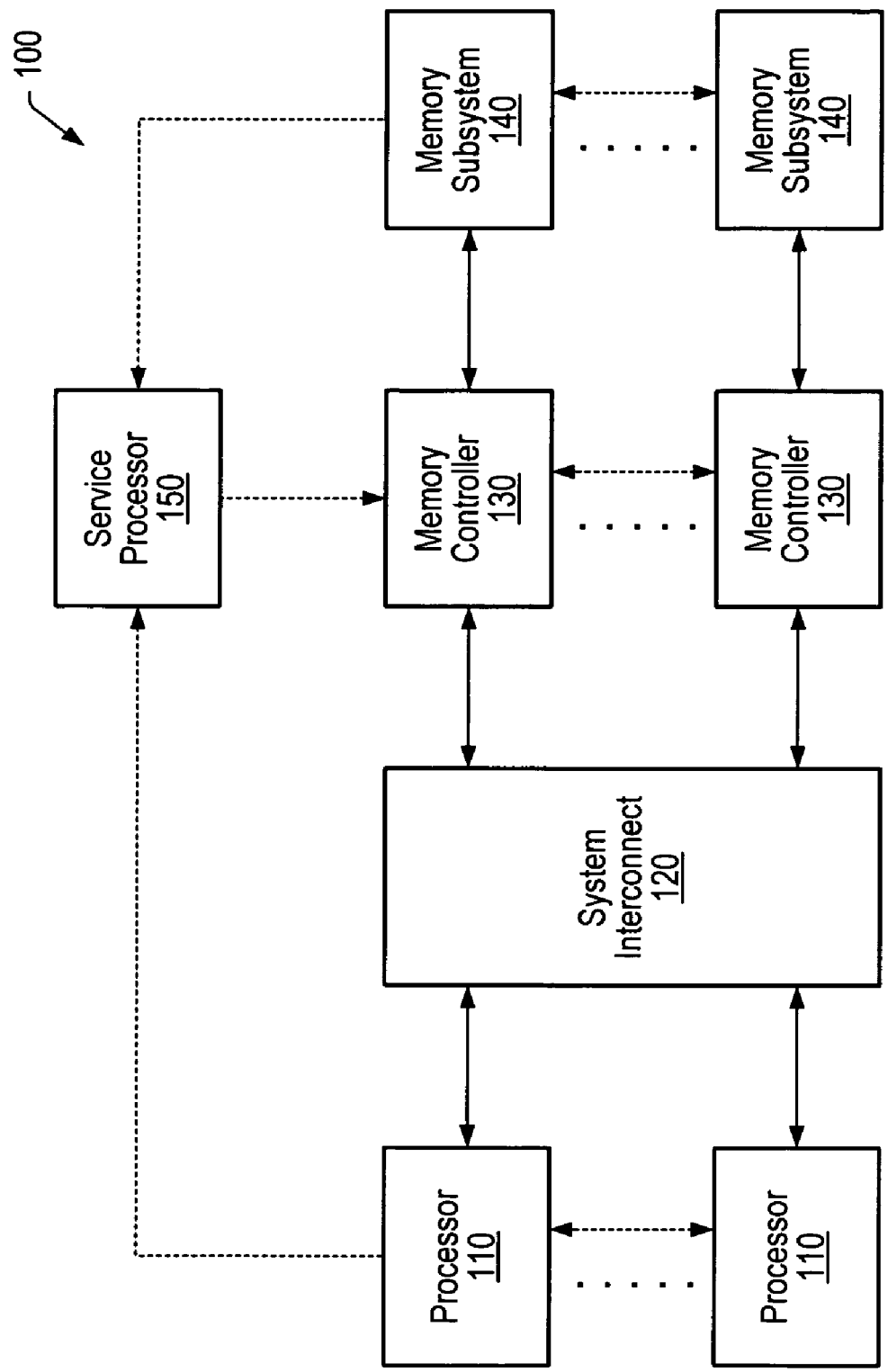
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of a computer system 100 is shown. In the illustrated embodiment, computer system 100 is a multiprocessing system including a plurality of processors 110. Processors 110 are coupled to a plurality of memory controllers 130 via a system interconnect 120. Each memory controller 130 is in turn shown coupled to a respective memory subsystem 140. In addition, computer system 100 includes a service processor 150 coupled to processors 110, memory controllers 130, and memory subsystems 140.

Each memory subsystem 140 is a memory medium for storing software programs and data. Memory subsystem 140 may collectively form the main memory of computer system 100 from which programs primarily execute. A suitable memory subsystem 140 may include one or more memory devices such as Dynamic Random Access Memory (DRAM) devices. For example, a plurality of banks of Synchronous DRAM (SDRAM), Double Data Rate (DDR) SDRAM, or Rambus DRAM (RDRAM) devices may be suitable. The memory devices may be incorporated on one or more memory modules, such as Dual In-Line Memory Modules (DIMMs).

Memory controllers 130 are configured to control memory transactions between the corresponding memory subsystems 140 and processors 110. Each memory controller 130 may be located on-chip with one or more processors 110 or may be located off-chip, for example, as part of a Northbridge chipset.

System interconnect 120 is illustrative of any interconnect structure for coupling processors 110 to memory controllers 130. In one embodiment, system interconnect 120 may be formed by a shared bus. In other embodiments, system interconnect 120 may be formed by a point-to-point switched network.

Each processor 110 may be representative of a processor in the SPARC™ family of processors. However, it is contemplated that in other embodiments, processors 110 may be representative of other types of processors such as processors in the x86 family of processors, for example.

In the illustrated embodiment, computer system 100 is representative of a high performance server system. Service processor 150 may be provided to control various management functions associated with such a system. For example, service processor 150 may perform various administrative functions such as, for example, configuration control including software partitioning and clustering, the control of various test functionality, and/or failover and administrator alerting functionality.

As will be described in further detail below, in the depicted embodiment, service processor 150 may further be operable to implement dynamic memory throttling techniques to limit thermal and/or power conditions associated with memory subsystems 140. More particularly, in one embodiment, service processor 150 may be configured to cause a memory controller 130 to insert one or more idle cycles between a plurality of memory accesses in response to detecting that the temperature of the corresponding memory subsystem 140 is above a predetermined threshold. Service processor 150 may further be configured to cause a memory controller 130 to insert one or more idle cycles between a plurality of memory accesses in response to detecting that the current draw of the memory subsystems 140 is above a predetermined threshold. In this matter, over-temperature and/or over-current conditions may be limited.

Figure 2:
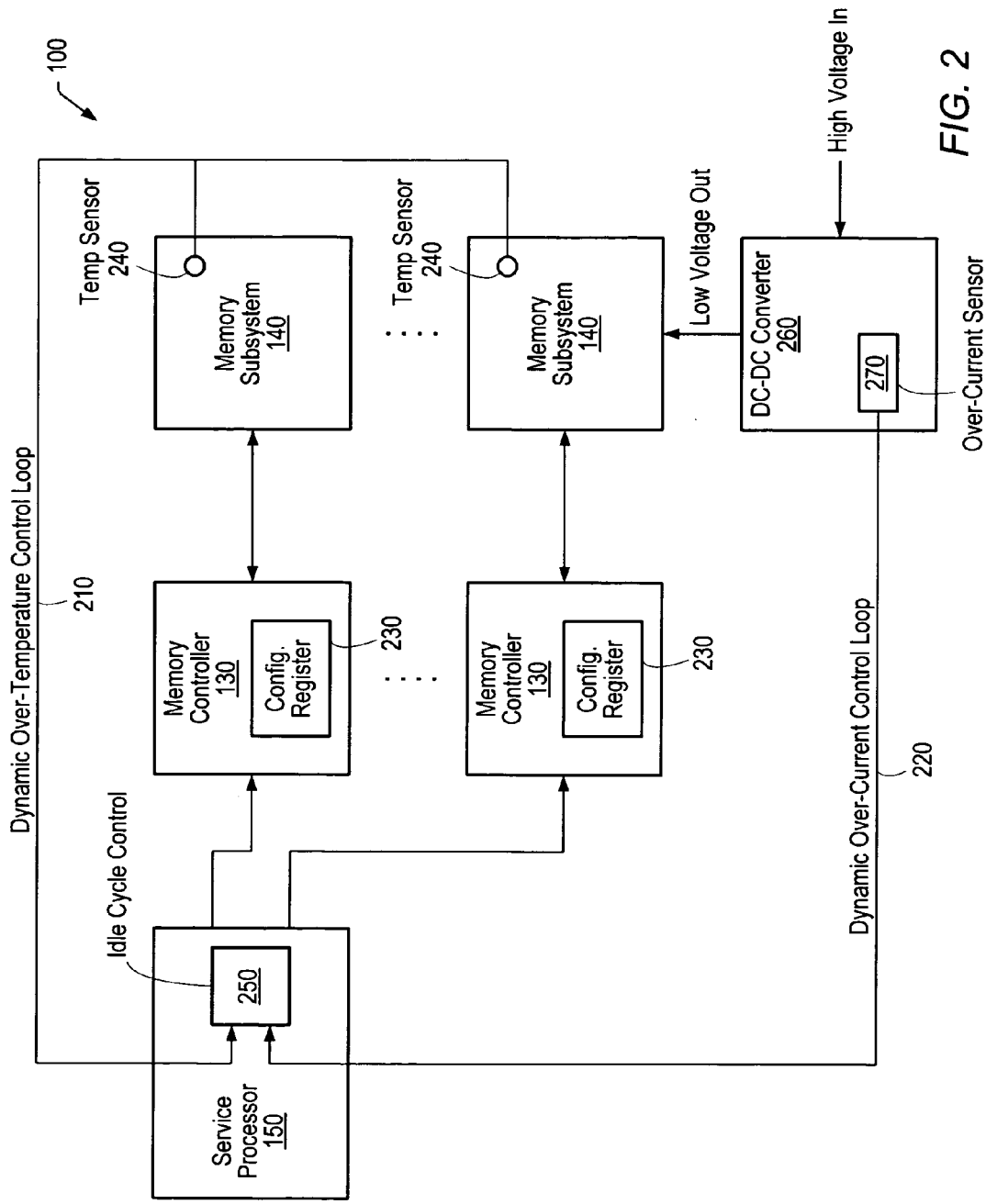
FIG. 2 is a block diagram illustrating aspects of one embodiment of a computer system including a representation of a dynamic over-temperature control loop and a dynamic over-current control loop.

Referring to FIG. 2, a block diagram illustrating further aspects of one embodiment of computer system 100 is shown. Components that correspond to those shown in FIG. 1 are numbered identically for simplicity and clarity. As depicted in FIG. 2, in this embodiment, service processor 150 may include an idle cycle control function 250, memory controllers 130 may include configuration registers 230, each memory subsystems 140 may include a temperature sensors 240, and DC-to-DC converter 260 may include an over-current sensor 270. Furthermore, as illustrated, a dynamic over-temperature control loop 210 is formed by a feedback path from temperature sensors 240 to service processor 150. Likewise, a dynamic over-current control loop 220 is formed by a feedback path from over-current sensor 270 to service processor 150.

In the illustrated embodiment, each memory subsystem 140 may include a temperature sensor 240 that is positioned to detect a temperature associated with the corresponding memory subsystem 140. For example, each temperature sensor 240 may be positioned in a "hot spot" of each memory subsystem 140. In one embodiment, a "hot spot" may be a location of each memory subsystem 140 that is downstream from the airflow of a system fan.

As shown in FIG. 2, computer system 100 may also include DC-to-DC converter 260 to convert a high voltage to a low voltage, which is supplied to each memory subsystem 140 to provide power to the plurality of memory subsystems 140. In addition, DC-to-DC converter 260 may include an over-current sensor 270 to detect a current draw of memory subsystems 140.

In the illustrated embodiment, service processor 150 may include idle cycle control function 250 to determine whether to program a memory controller 130 to insert one or more idle clock cycles between memory accesses. Idle cycle control function 250, in one embodiment, may be implemented in software and may include one or more recipes or algorithms to determine whether an over-temperature and/or an over-current condition may exist in a memory subsystem 140 and, if so, at what rate to insert the one or more idle clock cycles.

Furthermore, in the illustrated embodiment, memory controllers 130 may include configuration registers 230. In one embodiment, the idle cycle control function 250 of service processor 150 may program the configuration registers 230 of a memory controller 130 so that the memory controller 130 inserts the one or more idle cycles between memory accesses.

Figure 3:
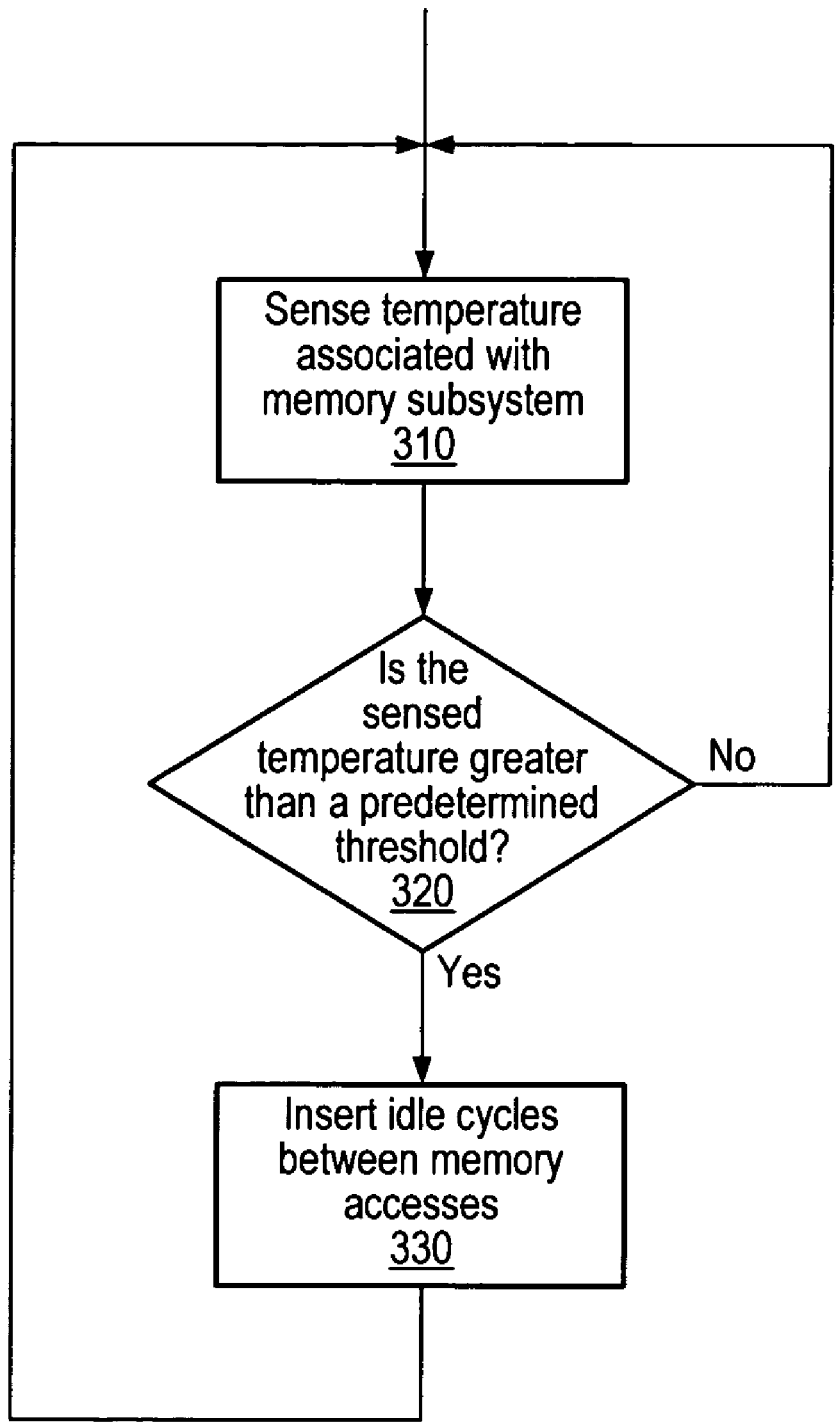
FIG. 3 is a flow diagram illustrating a process for inserting idle cycles between memory accesses.

During operation, each memory controller 130 may be configured to selectively insert one or more idle clock cycles between memory accesses depending upon the sensed temperature of the associated memory subsystem 140. Referring collectively to FIG. 2 and FIG. 3, each temperature sensor 240 is operable to detect a temperature associated with each corresponding memory subsystem 140 (block 310). In this embodiment, service processor 150 may be configured to receive a control signal from each temperature sensor 240 that is indicative of the temperature of the corresponding memory subsystem 140 and determine if each sensed temperature is greater than a predetermined threshold (block 320). Specifically, idle cycle control function 250 may be used to compare each sensed temperature with the temperature threshold to determine whether there is an over-temperature condition in one or more memory subsystems 140. If the sensed temperature is below the temperature threshold, no idle cycles are inserted between memory accesses. However, if the sensed temperature is greater than the temperature threshold (i.e., over-temperature condition), service processor 150 programs the memory controller 130 to insert one or more idle cycles between a plurality of memory accesses at a particular rate (block 330). In this embodiment, idle cycle control function 250 may also be used to determine the particular rate of inserting the one or more idle cycles so that service processor 150 may program the memory controller 130 accordingly.

It is noted that in another implementation, each temperature sensor 240 may be configured to detect the temperature of the corresponding memory subsystem 140 and determine if there is an over-temperature condition. In this embodiment, if an over-temperature condition exists in a particular memory subsystem 140, the corresponding temperature sensor 240 may send an interrupt to service processor 150. The interrupt may cause service processor 150 to program the corresponding memory controller 130 to insert idle cycles between memory accesses. In some embodiment, the idle cycle control function 250 of service processor 150 may further use the detected temperature to determine the particular rate for inserting idle cycles.

Figure 4:
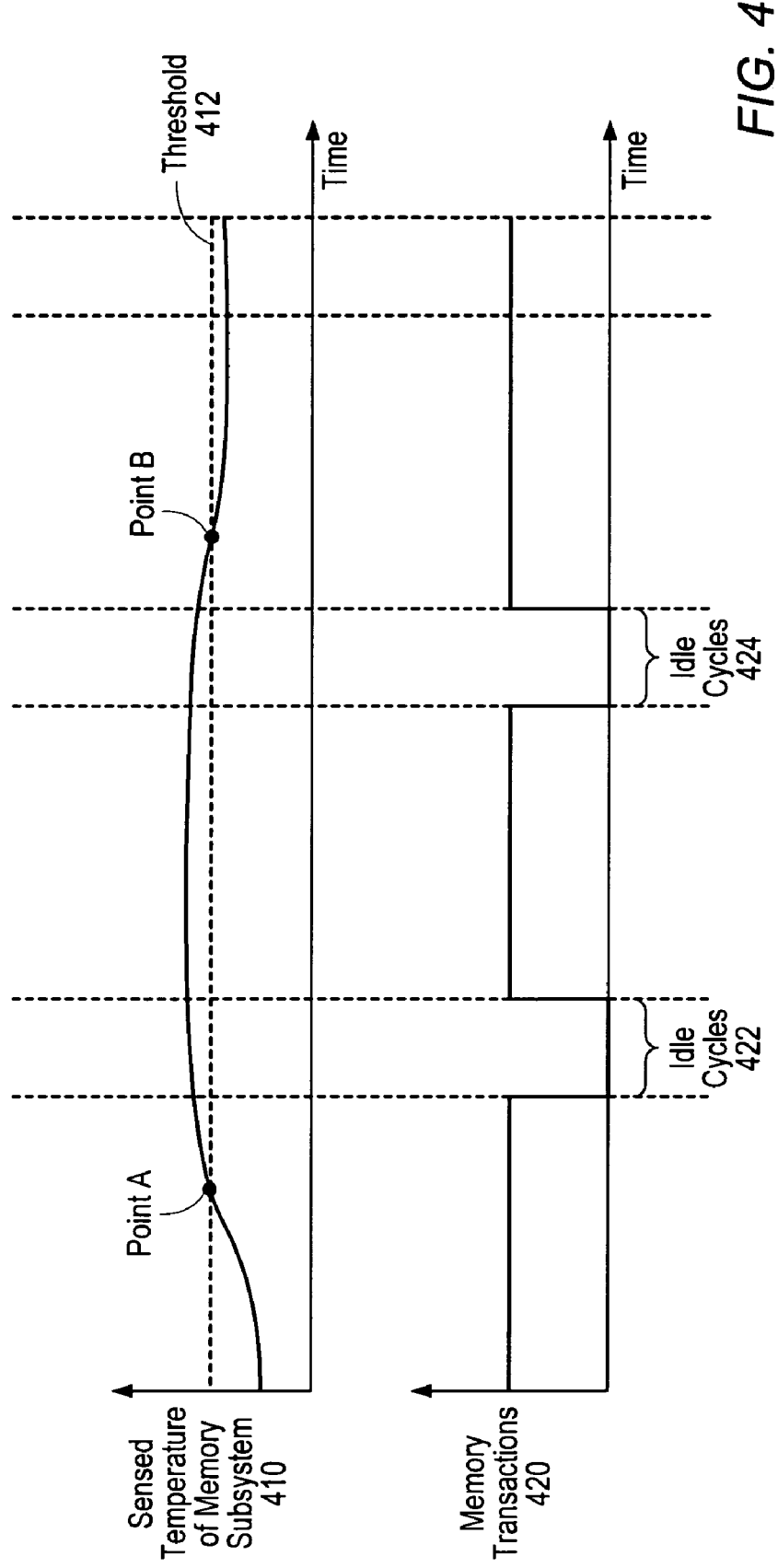
FIG. 4 is a timing diagram illustrating insertion of idle cycles between a plurality of memory accesses.

Turning now to FIG. 4, timing diagrams illustrating insertion of idle cycles between a plurality of memory accesses are shown. Referring collectively to FIG. 2 and FIG. 4, graph 410 illustrates an example of a detected temperature associated with a memory subsystem 140. Graph 420 illustrates an example of memory transactions to the memory subsystem 140 from the associated memory controller 130. As depicted, idle cycles 422 are inserted between memory accesses by the corresponding memory controller 130 after the sensed temperature rises above temperature threshold 412 (Point A), and subsequent idle cycles 424 are also inserted because the sensed temperature remains above threshold 412. However, as illustrated, after the sensed temperature falls below threshold 412 (Point B), the memory controller 130 stops inserting idle cycles.

In one embodiment, service processor 150 may be configured to provide hysteresis in the implementation of dynamic control loops 210 and 220, which may prevent the temperature and current draw of a memory subsystem 140 from violating the corresponding thresholds repeatedly within a short period of time. For example, a memory controller 130 may continue to insert idle cycles between memory accesses after the sensed temperature drops below the threshold until a specified temperature is reached. In another embodiment, the memory controller 130 may continue to insert idle cycles for a specified time after the sensed temperature drops below the threshold.

Figure 5:
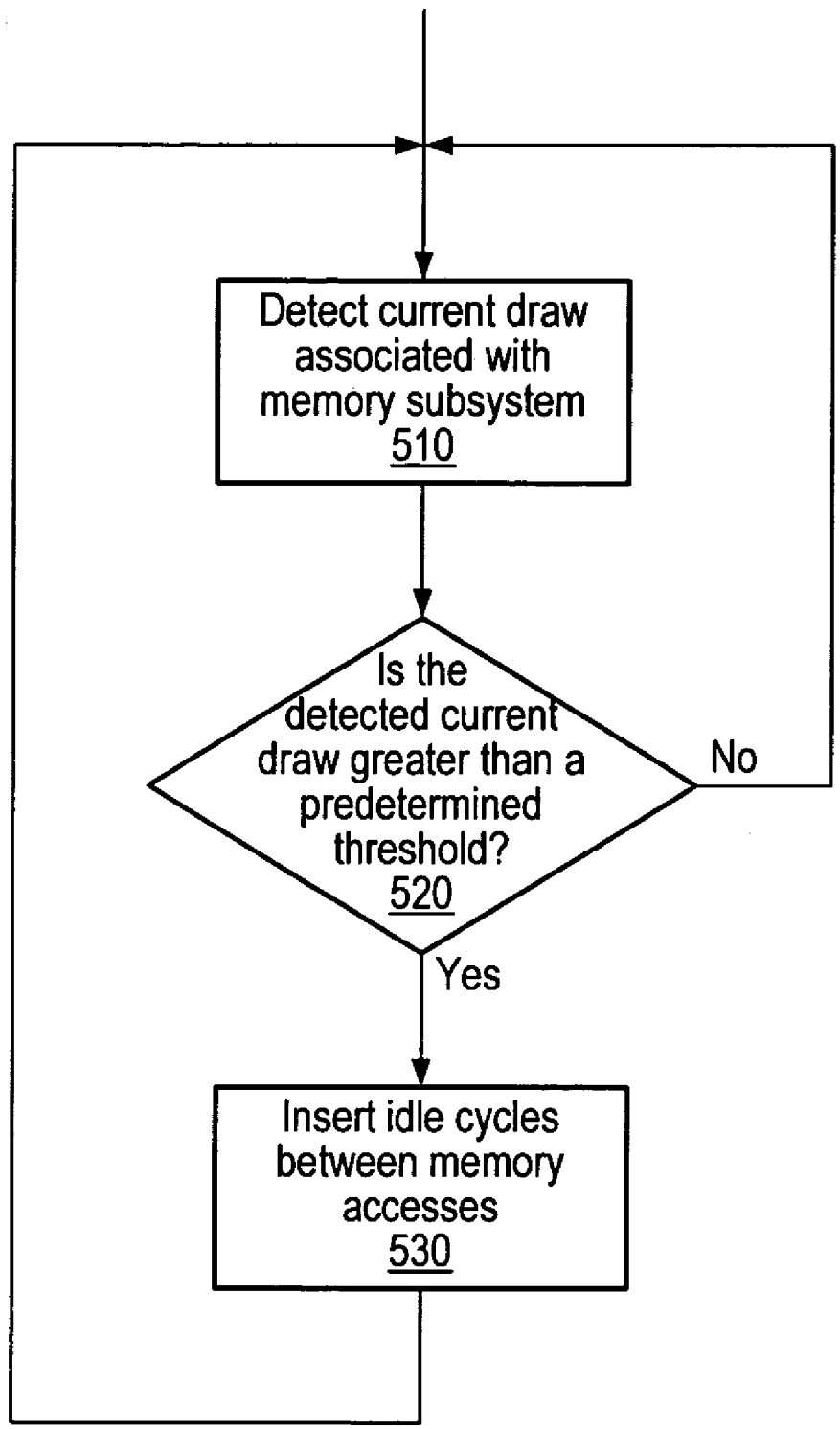
FIG. 5 is a flow diagram illustrating another process for inserting idle cycles between memory accesses.

Referring again to FIG. 2, each memory controller 130 may further or alternatively be configured to selectively insert one or more idle clock cycles between memory accesses depending upon the detected power condition of memory subsystems 140. Referring collectively to FIG. 2 and FIG. 5, over-current sensor 270 may be coupled to detect a power condition associated with memory subsystems 140. For example, over-current sensor 270 may detect a current draw of memory subsystems 140 (block 510). In this embodiment, service processor 150 may be configured to receive a control signal from over-current sensor 270 that is indicative of the detected current draw and determine if the detected current draw is greater than a predetermined threshold (block 520). Specifically, idle cycle control function 250 may be used to compare the detected current draw with the over-current threshold to determine whether there is an over-current condition in memory subsystems 140. If the detected current draw is below the over-current threshold, no idle cycles are inserted between memory accesses. However, if the detected current draw is greater than the threshold (i.e., over-current condition), service processor 150 programs memory controllers 130 to insert one or more idle cycles between a plurality of memory accesses at a particular rate (block 530). In this embodiment, idle cycle control function 250 may also be used to determine the particular rate of inserting the one or more idle cycles so that service processor 150 may program the memory controllers 130 accordingly.

It is noted that in another implementation, over-current sensor 270 may be configured to detect the current draw of memory subsystems 140 and determine if there is an over-current condition. In this embodiment, if an over-current condition is detected, over-current sensor 270 may send an interrupt to service processor 150. The interrupt may cause service processor 150 to program memory controllers 130 to insert idle cycles between memory accesses. In this embodiment, service processor 150 may use the detected current draw to determine the particular rate for inserting idle cycles.

Furthermore, in the illustrated embodiment of FIG. 2, idle cycle control function 250, which may be included in service processor 150, may determine the rate at which memory controllers 130 insert one or more idle cycles depending upon how much the sensed temperature and/or detected current is above the corresponding threshold. For example, idle cycles may be inserted at a higher rate if the detected temperature is 10 degrees above the temperature threshold than if the detected temperature is 5 degrees above the threshold. In this embodiment, the rate of inserting idle cycles may change as the detected temperature drops; for example, the rate may be reduced. In another embodiment, the rate of inserting idle cycles may remain constant as the temperature drops; however, the rate of inserting idle cycles may be increased if the temperature rises. Furthermore, it is noted that various other methods for controlling the temperature associated with memory subsystem 140 may be implemented; for example, idle cycle control function 250 may program memory controllers 130 with a default rate at the start and then change the rate accordingly. The embodiments described above may be similarly implemented for an over-current condition.

Idle cycle control function 250 may also determine the rate at which memory controllers 130 insert idle cycles depending upon the type of condition detected. For example, if an over-temperature condition is detected in one or more memory subsystems 140, the corresponding one or more memory controllers 130 may slowly increase the rate of inserting idle cycles as desired. However, if an over-current condition is detected, memory controllers 130 may insert idle cycles at a relatively high rate from the start. Therefore, in this embodiment, if both an over-current condition and an over-temperature condition are detected in memory subsystems 140, idle cycle control function 250 may program memory controllers 130 to insert idle cycles at a relatively high rate, which in this case may be the rate associated with the particular over-current condition.

Memory controllers 130 may insert one or more idle cycles at any rate to attempt to resolve an over-temperature condition and/or an over-current condition. In one embodiment, memory controllers 130 may be configured to insert idle cycles between every $n^{th}$ and $n^{th}+1$ successive memory access. For example, one or more idle cycles may be inserted between every $5^{th}$ and $6^{th}$ memory access. In another embodiment, service processor 150 may program memory controllers 130 to insert one or more idle cycles or to change the number of idle cycles at a linear rate. For example, memory controllers 130 may first insert one idle cycle every 10 memory accesses, then one idle cycle every 8 memory accesses, and then one idle cycle every 6 memory accesses, and so on. In another example, memory controllers 130 may begin inserting one idle cycle every 10 memory accesses, then after a predetermined amount of time memory controller may insert two idle cycles every 10 memory access, and then 3 idle cycles every 10 memory accesses, and so on. In yet another embodiment, service processor 150 may program memory controllers 130 to insert one or more idle cycles or to change the number of idle cycles at an exponential rate.

Figure 6:
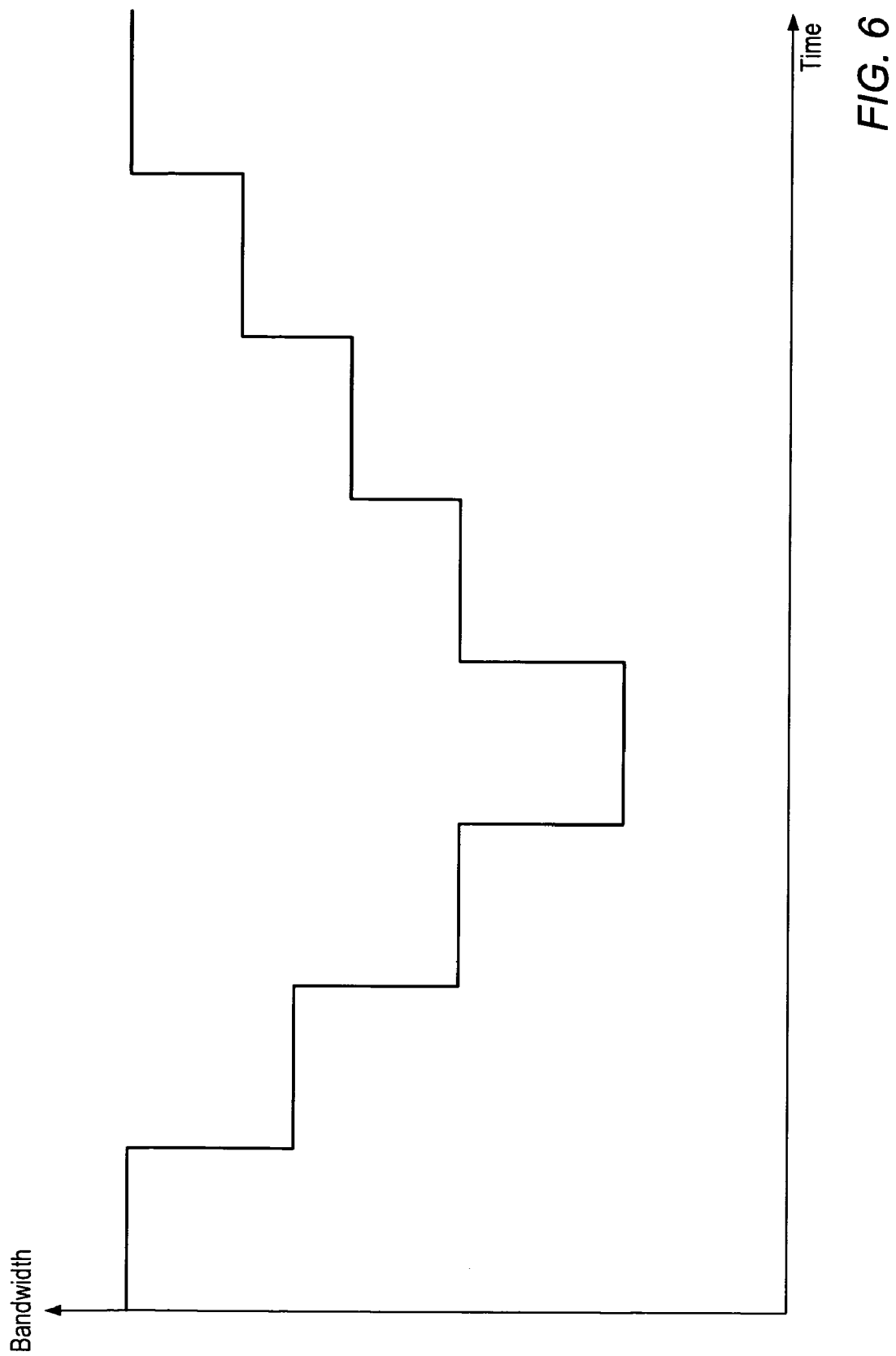
FIG. 6 is a graph illustrating changes in memory bandwidth as a result of inserting idle cycles between memory accesses.

FIG. 6 shows a graph illustrating the effect of inserting idle cycles on memory bandwidth. As shown, inserting idle cycles between memory accesses may lower the memory bandwidth, which may then cause a corresponding decrease in the temperature and current draw of memory subsystems 140.

It is noted that in an alternative embodiment of FIG. 2, if the sensed temperature of one of the memory subsystems 140 is above the temperature threshold, idle cycle control function 250 of service processor 150 may program all of the memory controllers 130 (rather than a subset of memory controllers 130) to insert idle cycles. In another alternative embodiment, computer system 100 may include multiple current sources each having an over-current sensor 270. In this alternative embodiment, service processor 150 may program only the one or more memory controllers 130 associated with the over-current condition to insert idle cycles.

It is also noted that in alternative embodiments of computer system 100, the insertion of idle cycles may be controlled by other hardware and/or software mechanisms. For example, in some embodiments, the functionality of idle cycle control function 250 may be implemented within memory controllers 130.

In addition, the idle cycle control functionality described above may also be employed in systems having other specific architectures. For example, the idle cycle control functionality may be employed within a single processor system and/or a system including a single memory controller and associated memory subsystem.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   a memory subsystem;
   a memory controller coupled to said memory subsystem and configured to control accesses to said memory subsystem; and
   a temperature sensor positioned to detect a temperature associated with said memory subsystem;
   wherein said memory controller is configured to selectively insert one or more idle clock cycles between a first memory access and a second memory access depending upon said sensed temperature.

2. The apparatus of claim 1, wherein in response to said sensed temperature being greater than a predetermined threshold, said memory controller is configured to insert said one or more idle clock cycles between said first memory access and said second memory access.

3. The apparatus of claim 2, wherein in response to said sensed temperature being greater than said predetermined threshold, said memory controller is configured to insert said one or more idle clock cycles between every $n^{th}$ and $n^{th}+1$ memory access.

4. The apparatus of claim 1, further comprising a service processor coupled to said memory controller and configured to receive a control signal from said temperature sensor.

5. The apparatus of claim 4, wherein in response to said control signal indicating that said sensed temperature is greater than a predetermined threshold, said service processor is further configured to program said memory controller to insert said one or more idle clock cycles.

6. The apparatus of claim 5, wherein said memory controller is configured to insert said one or more idle cycles between each of a plurality of additional memory accesses.

7. The apparatus of claim 5, wherein said service processor is configured to change a rate at which idle cycles are inserted between a plurality of additional memory accesses depending upon said sensed temperature.

8. The apparatus of claim 7, wherein said rate is changed to a linear rate.

9. The apparatus of claim 7, wherein said rate is changed to an exponential rate.

10. The apparatus of claim 5, wherein said service processor is configured to change a number of idle cycles that are inserted between a plurality of additional memory accesses depending upon said sensed temperature.

11. A method comprising:
    sensing a temperature associated with a memory subsystem; and
    selectively inserting one or more idle clock cycles between a first memory access and a second memory access depending upon said sensed temperature.

12. The method of claim 11, wherein in response to said sensed temperature being greater than a predetermined threshold, inserting said one or more idle clock cycles between a plurality of memory accesses at a particular rate.

13. A computer system comprising:
    a processor;
    a memory subsystem;
    a memory controller coupled to said processor and said memory subsystem, wherein said memory controller is configured to control accesses to said memory subsystem by said processor;
    a temperature sensor positioned to detect a temperature associated with said memory subsystem; and
    a service processor coupled to said memory controller, wherein in response to said sensed temperature being greater than a predetermined threshold, said service processor is configured to program said memory controller to insert one or more idle clock cycles between a first memory access and a second memory access.

14. The computer system of claim 13, wherein said service processor is configured to change a number of idle cycles that are inserted between a plurality of additional memory accesses depending upon said sensed temperature.

* * * * *